US010676970B2

(12) United States Patent
Strigle et al.

(10) Patent No.: US 10,676,970 B2
(45) Date of Patent: Jun. 9, 2020

(54) PROTECTION BLOCK FOR VEHICLE DOOR LOCK

(71) Applicant: TOYOTA MOTOR ENGINEERING & MANUFACTURING NORTH AMERICA, INC., Erlanger, KY (US)

(72) Inventors: Kimberly A. Strigle, Findlay, OH (US); Josh D. Fraley, Saline, MI (US); Joseph C. Walusek, Ann Arbor, MI (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 106 days.

(21) Appl. No.: 15/479,826

(22) Filed: Apr. 5, 2017

(65) Prior Publication Data
US 2018/0291653 A1 Oct. 11, 2018

(51) Int. Cl.
| E05B 77/04 | (2014.01) |
| E05B 79/20 | (2014.01) |
| B60J 5/04 | (2006.01) |
| E05B 77/10 | (2014.01) |
| E05B 77/02 | (2014.01) |
| E05B 77/06 | (2014.01) |
| E05B 79/02 | (2014.01) |
| E05B 83/40 | (2014.01) |

(52) U.S. Cl.
CPC ............ *E05B 77/04* (2013.01); *B60J 5/0433* (2013.01); *B60J 5/0451* (2013.01); *E05B 77/02* (2013.01); *E05B 77/06* (2013.01); *E05B 77/10* (2013.01); *E05B 79/20* (2013.01); *E05B 79/02* (2013.01); *E05B 83/40* (2013.01)

(58) Field of Classification Search
None
See application file for complete search history.

(56) References Cited

U.S. PATENT DOCUMENTS

| 4,634,159 A | * | 1/1987 | Uchida | ................. B60J 5/0433 |
| | | | | 292/336.3 |
| 4,662,109 A | * | 5/1987 | Yui | ......................... E05B 83/40 |
| | | | | 49/214 |
| 6,019,418 A | * | 2/2000 | Emerling | .............. B60J 5/0416 |
| | | | | 296/146.7 |
| 7,648,192 B2 | * | 1/2010 | Herline | ................... E05B 77/04 |
| | | | | 292/92 |
| 8,465,064 B2 | | 6/2013 | Ghannam | |
| 8,596,402 B2 | | 12/2013 | Abidi | |

(Continued)

FOREIGN PATENT DOCUMENTS

| CA | 2822666 A1 * | 6/2012 | ............ E05B 77/10 |
| CN | 204738633 | 11/2015 | |

(Continued)

*Primary Examiner* — Marcus Menezes
(74) *Attorney, Agent, or Firm* — Oblon, McClelland, Maier & Neustadt, L.L.P.

(57) ABSTRACT

Disclosed herein is a door, lock and a protector block. The door includes an inner panel, a lock including a cable mounting plate and an inner surface, the inner surface faces the inner panel and connects to the inner panel such that an inner space is created between the cable mounting plate and the inner panel, and a protector block connected to the inner surface of the rear lock within the inner space present between the cable mounting plate and the inner panel.

18 Claims, 12 Drawing Sheets

(56) References Cited

U.S. PATENT DOCUMENTS

| | | | | |
|---|---|---|---|---|
| 8,955,257 B2* | 2/2015 | Moriya | ............... | B60J 5/0425 |
| | | | | 49/502 |
| 2007/0194577 A1* | 8/2007 | Margheritti | ............ | E05B 81/25 |
| | | | | 292/216 |
| 2010/0236305 A1* | 9/2010 | Beck | ..................... | E05B 77/10 |
| | | | | 70/237 |
| 2011/0258935 A1* | 10/2011 | Heller | ................... | B60J 5/0451 |
| | | | | 49/502 |
| 2014/0319857 A1 | 10/2014 | Zimmer et al. | | |
| 2015/0115585 A1* | 4/2015 | Smith | ................. | B60R 21/0428 |
| | | | | 280/751 |
| 2015/0145262 A1 | 5/2015 | Gotzen et al. | | |
| 2015/0197966 A1* | 7/2015 | Regnault | ................. | E05B 77/04 |
| | | | | 292/200 |
| 2015/0224858 A1* | 8/2015 | Yoshimoto | ............. | B60J 5/0434 |
| | | | | 292/336.3 |
| 2016/0168882 A1* | 6/2016 | Chung | ................... | E05B 79/20 |
| | | | | 292/92 |

FOREIGN PATENT DOCUMENTS

| | | | | |
|---|---|---|---|---|
| DE | 202014105876 U1 * | 2/2015 | ............ | E05B 77/06 |
| DE | 202016102211 U1 * | 7/2017 | ............ | E05B 77/04 |

* cited by examiner

PROTECTION BLOCK FOR VEHICLE DOOR LOCK

BACKGROUND

Field of the Disclosure

This disclosure relates generally to improvements to door locks. More particularly the present disclosure relates to deflection prevention of a vehicle's door lock cable upon side impact.

Description of the Related Art

Conventionally, a door, for example a vehicle door, includes a locking mechanism with actuating elements connected to transmit a force to latch or unlatch the lock. The locking mechanism includes a release lever as a part of the transmission element that allows latching and unlatching of the lock.

It is co only observed that a vehicle door may be hit by an external object such as another vehicle or a pole. In such situations, the doors of the vehicle should remain closed and not open inadvertently. In the event of a side impact or a side collision the door may experience a significant deformation that can cause the lock to unlatch. Doors that open automatically in the event of an impact may cause an occupant be thrown out. As such, the door should not unlock automatically in case of an impact to contain passengers within the vehicle.

Furthermore, the impact may damage actuation elements or the locking mechanism making the lock inoperable. The locking mechanism has a relatively complex structure that is costly and heavy. In the case of severe deformation of the door structure, the complex structure of this mechanism may be difficult to repair and can be costly. As such, protection of important elements of the locking mechanism is desired to prevent deformation or accidental actuation of the mechanism.

SUMMARY

According to an embodiment of the present disclosure, there is provided a door. The door includes an inner panel, a lock including a cable mounting plate and an inner surface, the inner surface faces the inner panel and connects to the inner panel such that an inner space is created between the cable mounting plate and the inner panel, and a protector block connected to the inner surface of the rear lock within the inner space present between the cable mounting plate and the inner panel.

Furthermore, according to an embodiment of the present disclosure, there is provided a lock. The lock includes a cable located on a first side of the lock, a release lever connected to the cable, a cable mounting plate having supporting the cable on a first side of the lock, and a protector block connected to around the cable mounting plate on a second side of the lock preventing the cable mounting plate from buckling when a force is applied on the first side of the cable mounting plate.

Furthermore, according to an embodiment of the present disclosure, there is provided a protector block. The protector block includes a hollow pocket, a plurality of ribs formed within the hollow pocket creating a plurality of pockets, a first cylinder projecting from one of the plurality of pockets, a second cylinder projecting from one of the plurality of ribs, and a fastening hole located between the first cylinder and the second cylinder.

The forgoing general description of the illustrative implementations and the following detailed description thereof are merely exemplary aspects of the teachings of this disclosure, and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings.

DETAILED DESCRIPTION

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed embodiment(s). However, it will be apparent to those skilled in the art that the disclosed embodiment(s) may be practiced without those specific details. In some instances, well-known structures and components may be shown in block diagram form in order to avoid obscuring the concepts of the disclosed subject matter.

It is to be understood that terms such as "front," "rear," "up," and the like that may be used herein merely describe points of reference and do not necessarily limit embodiments of the present disclosure to any particular orientation or configuration. Furthermore, terms such as "first," "second," "third," etc., merely identify one of a number of portions, components, and/or points of reference as disclosed herein, and likewise do not necessarily limit embodiments of the present disclosure to any particular configuration or orientation.

Furthermore, the terms "approximately," "proximate," "minor," and similar terms generally refer to ranges that include the identified value within a margin of 20%, 10% or preferably 5% in certain embodiments, and any values therebetween.

Figure 1:
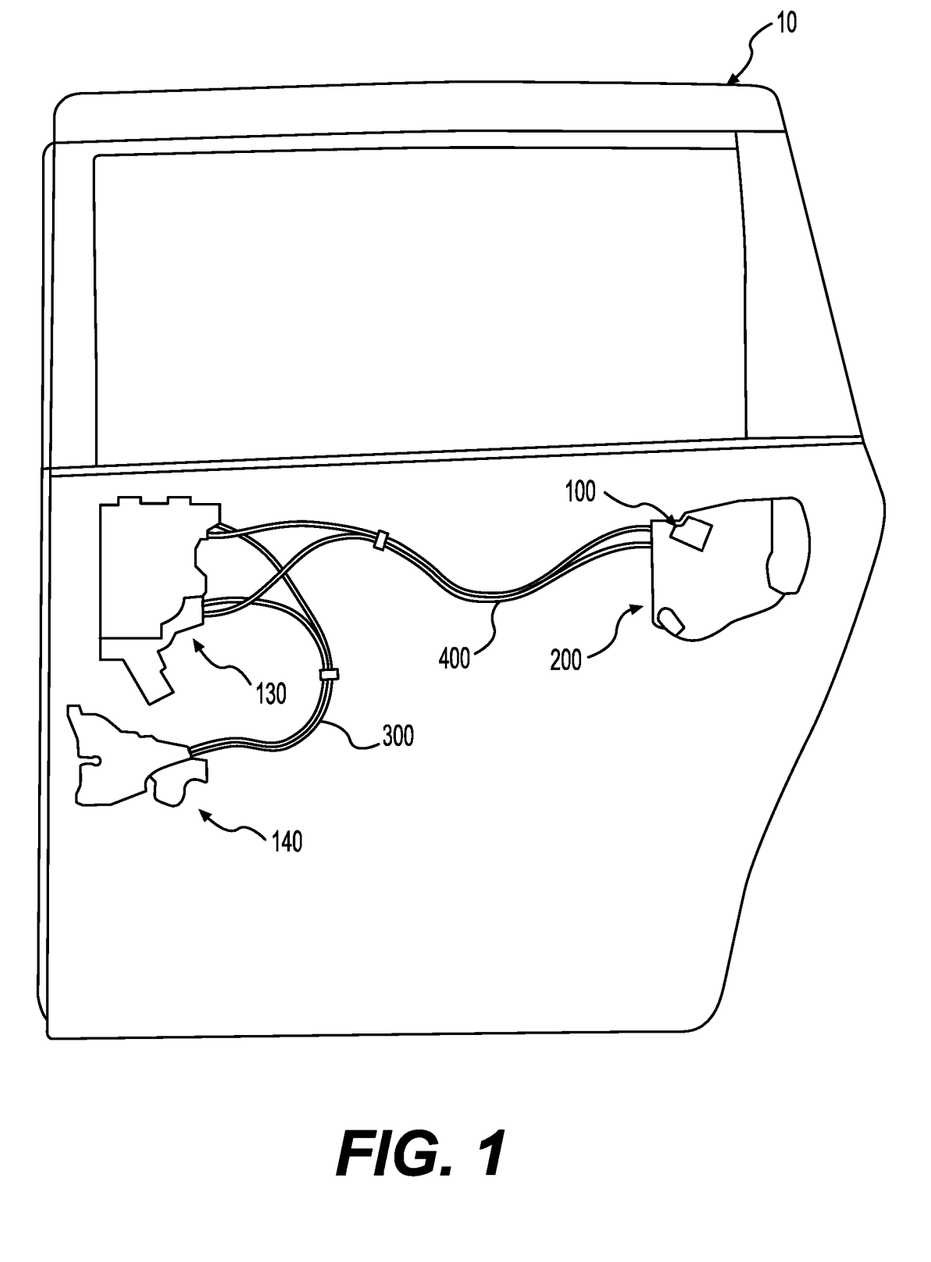
FIG. 1 illustrates a locking mechanism of a sliding door according to an exemplary embodiment of the present disclosure.

FIG. 1 illustrates a locking mechanism of a sliding door 10 according to according to an exemplary embodiment of the present disclosure. The sliding door 10 includes a handle 130, a front lock 140, a protector block 100 and a rear lock 200. The handle 130 is connected to the front lock 140 and the rear lock 200 via a front lock cable 300 and a rear lock cable 400 (also referred as a cable 400 hereinafter), respectively. The handle 130 can be used to manually latch or unlatch the front lock 140 and the rear lock 200 causing the sliding door 10 to open or close. When the handle 130 is pulled, a tension is created in the cables 300 and 400 causing the locking mechanism to release the rear lock 200 and the front lock 140. Alternatively or in addition, the front lock 140 and the rear lock 200 can be actuated automatically via motors configured to receive an open and close signal wirelessly from a controller (e.g., signal sent from a key) or via other controllers in the vehicle (e.g., switches in trim panels and/or consoles).

In certain situations, for example, in case of an impact, the rear lock 200 can be damaged (or deformed) and the cable 400 can be inadvertently pulled causing the rear lock 200 to open or stay open (or stuck open state). According to the present disclosure, the protector block 100 is provided to protect the rear lock 200 from damage and to prevent the cable 400 from getting accidently pulled. It should be noted that the present disclosure is not limited to the rear lock 200 and can be modified or adopted to work with any lock that causes a cable to accidentally pull a release lever unlatching the lock.

Figure 2:
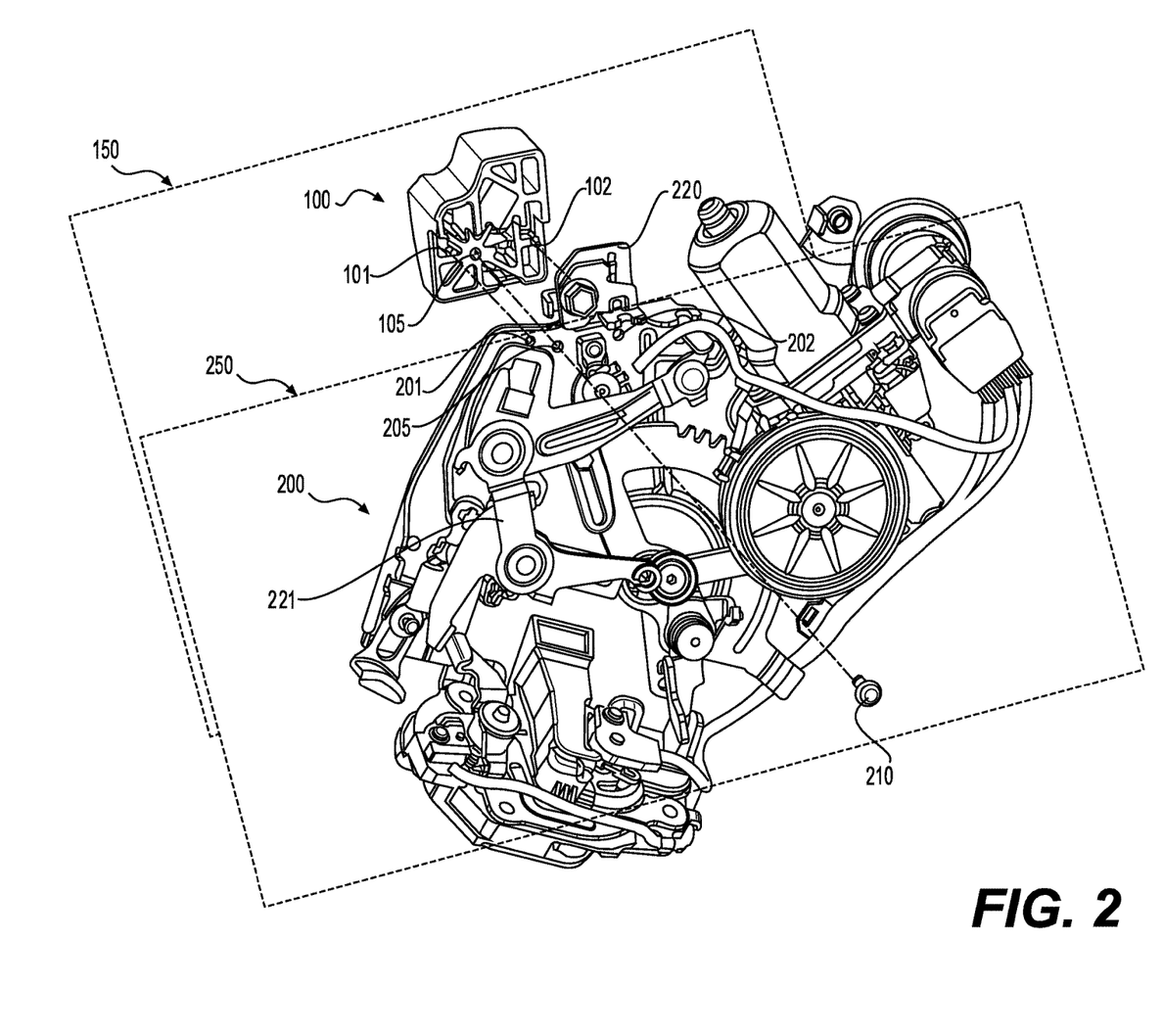
FIG. 2 is an exploded view of a rear lock and a protector block of the locking mechanism of the sliding door according to an exemplary embodiment of the present disclosure.

FIG. 2 is an exploded view of the rear lock 200 and the protector block 100 of the locking mechanism of the sliding door 10 (not illustrated) according to an exemplary embodiment of the present disclosure. The protector block 100 can be located between an inner panel 150 of the sliding door 10 (not illustrated in FIG. 2) and the rear lock 200. The rear lock 200 can be further connected to an outer panel 250 of the sliding door 10.

The rear lock 200 includes a cable mounting plate 220 and a release lever 221. The cable mounting plate 220 is a small metallic plate used to support the cable 400 (illustrated in FIG. 9). The release lever 221 can be any device used to release or engage a lock such as the rear lock 200. The release lever 221 can be connected to the cable 400 such that the release lever 221 moves or pivots upon applying tension to the cable 400 causing the rear lock 200 to release (or unlatch). In one example, the release lever 221 is located on an outer surface (i.e., a surface of the rear lock 200 facing the outer panel 250).

The rear lock 200 can further include a first hole 201, a second hole 202, and a fastening hole 205 to attach the protector block 100. The protector block 100 can be attached around the cable mounting plate 220 of the rear lock 200 on an inner surface (i.e., a surface of the rear lock 200 facing the inner panel). Thus, the protector block 100 can prevent any deformation (e.g., bending) of the cable mounting plate 220 in an inward direction (i.e., towards the inner panel 150), further discussed with respect to FIGS. 4A-4B, 5A-5B, and 6A-6B.

The protector block 100 can be any regular or irregular shaped component configured to prevent deformation of the rear lock 200, in particular deformation of the cable mounting plate 221. The protector block 100 can include a first cylinder 101, a second cylinder 102, and a fastening hole 105 to allow assembly of the protector block 100 with the rear lock 200. The first cylinder 101 can be inserted in the first hole 201 and the second cylinder 102 can be inserted in the second hole 202 for alignment and assembly purposes. The fastening hole 105 of the protector block 100 can be aligned with the fastening hole 201 of the rear lock 200 and the protector block 100 can be fastened to the rear lock 200 with a fastener 210 or other appropriate fastener. Alternatively, or in addition, the protector block 100 can be glued to the rear lock 200. The protector block 100 is further illustrated in FIGS. 3A-3D.

Figure 3A:
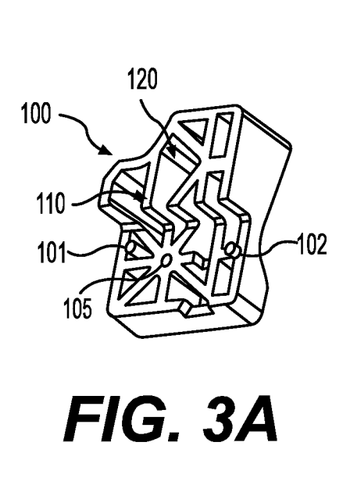
FIG. 3A is a perspective view of the protector block according to an exemplary embodiment of the present disclosure.

FIG. 3A is a perspective view of the protector block 100 according to an exemplary embodiment of the present disclosure. The protector block 100 can be an irregular shaped component made of resin, plastic material or other moldable material. The protector block 100 can have a hollow portion 120 with ribs 110 formed within the hollow portion 120. Thus, forming a plurality of pockets 120 between the ribs 110. Such a hollow and ribbed construction can make the protector block 100 lighter and strong.

Figure 3B:
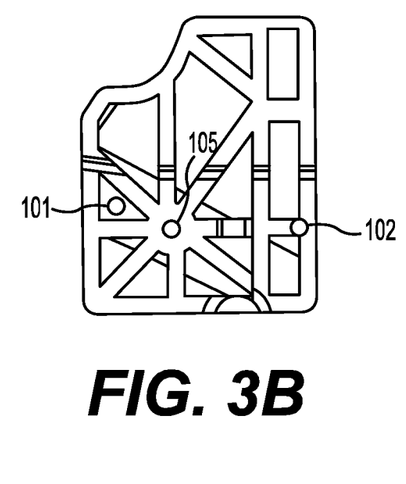
FIG. 3B is a front view of the protector block according to an exemplary embodiment of the present disclosure.
Figure 3C:
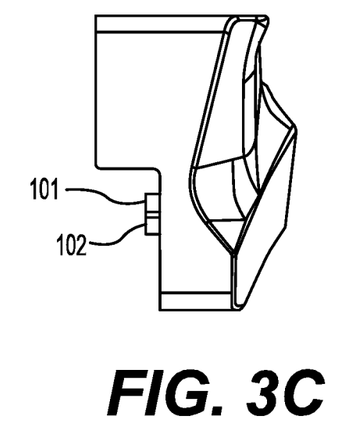
FIG. 3C is a side view of the protector block according to an exemplary embodiment of the present disclosure.
Figure 3D:
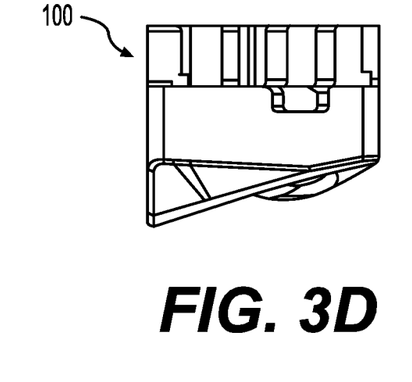
FIG. 3D is a top view of the protector block according to an exemplary embodiment of the present disclosure.

The protector block 100 can include assembly features such as the first cylinder 101, the second cylinder 102, and the fastening hole 105. The first cylinder 101 can be formed inside a pocket of the plurality of pockets 120 and project outside the pocket as shown in FIGS. 3B and 3C, a front view and a side view of the protector block 100, respectively. The second cylinder 102 can be formed on one of the ribs 110 and project to substantially match the length of the first cylinder 101. The fastening hole 105 is formed where one or more of the ribs 105 come together and join at a common location. Such web-like formation of the ribs 105 can also provide a structure to form the fastening hole 105. FIG. 3D illustrates a top view of the protector block 100 illustrating a substantially trapezoidal shape.

It should be noted that the present disclosure is not limited to the dimensions and locations of the first cylinder 101, the second cylinder 102, and the fastening hole 105. One or more of the first cylinder 101, the second cylinder 102 and the fastening hole 105 can have a different size and location, as can be understood by a person skilled in the art.

Figure 4A:
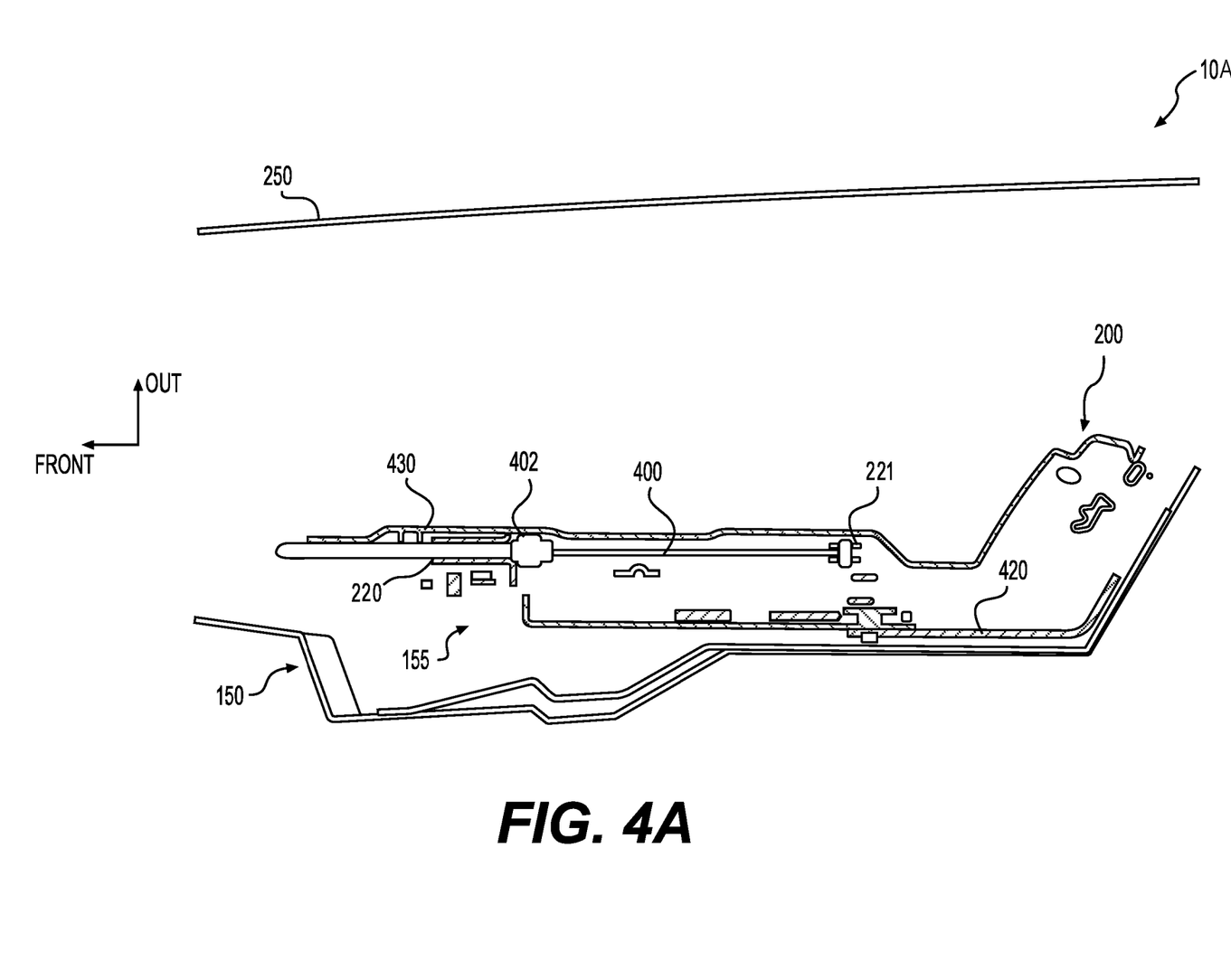
FIG. 4A is cross-section view of the sliding door with the rear lock according to an exemplary embodiment of the present disclosure.
Figure 4B:
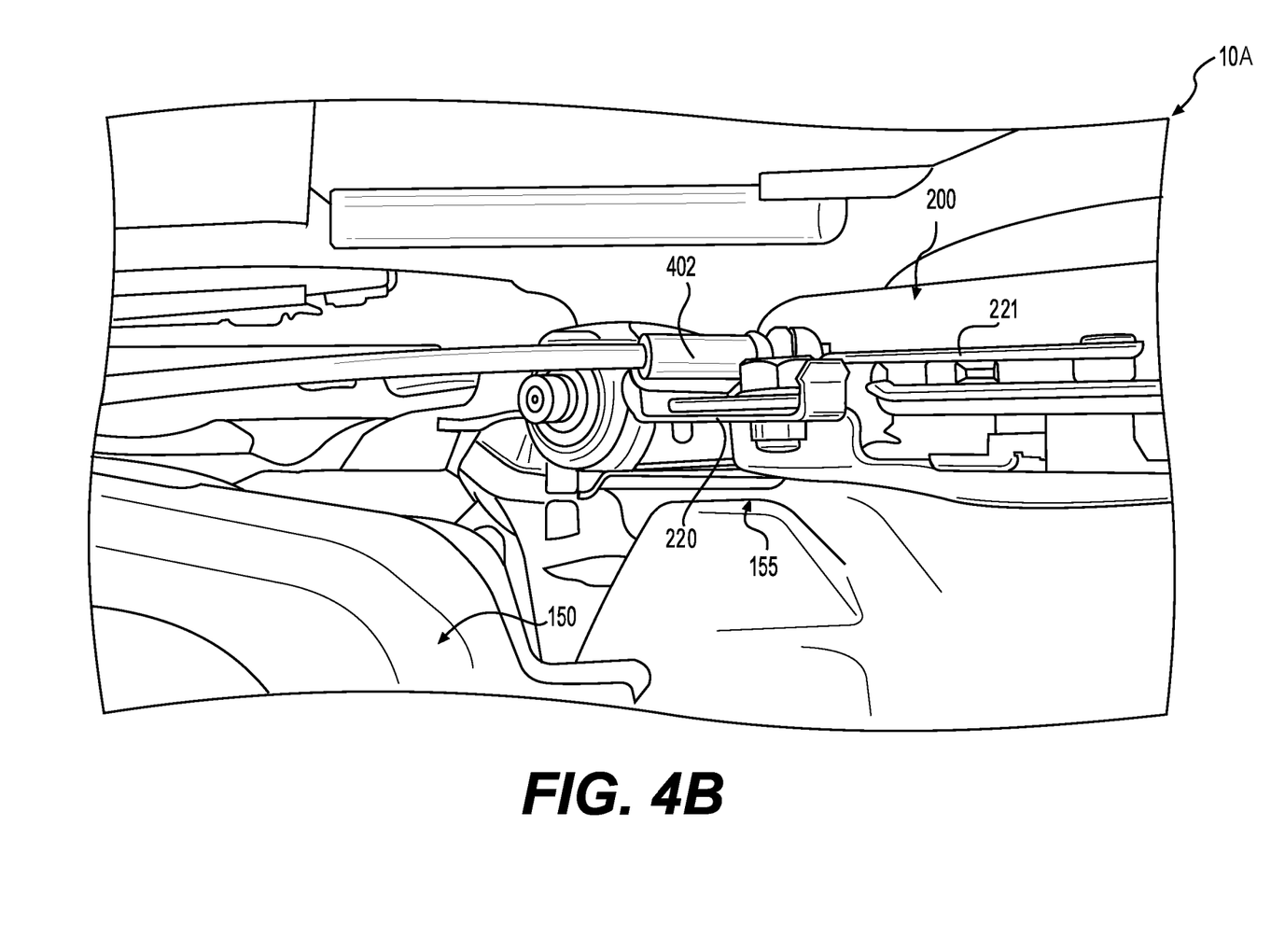
FIG. 4B an image of an existing sliding door with the rear lock before an impact testing according to an exemplary embodiment of the present disclosure.

FIG. 4A is cross-section view of a sliding door 10A with the rear lock 200 according to an exemplary embodiment of the present disclosure. The rear lock 200 includes the cable mounting plate 220, the release lever 221, and the cable 400. The rear lock 200 is placed between the inner panel 150 and the outer panel 250. The rear lock 200 can be attached to the inner panel 150 via a base plate 420. Between the inner surface of the rear lock 200 and the inner panel 150, an inner space 155 is created.

The inner space 155 can be a space between the cable mounting plate 220 and the inner panel 150. The inner space 155 can be irregular in shape and size. Due to the inner space 155, the cable mounting plate 220 acts as a cantilever beam with a fixed end at the cable cover 402. An example inner space 155 in an exemplary rear lock 200 before an impact testing is further illustrated in FIG. 4B.

Referring back to FIG. 4A, the cable mounting plate 220 can be a part of the rear lock 200 that supports the cable cover 402 in a fixed or removable manner. The cable cover 402, enclosing the cable 400, can be further connected to the handle 130 (not illustrated). The cable mounting plate 220 can be a metallic piece of the base plate 420 or the cable mounting plate 220 can be a separate metallic piece attached (e.g., by welding, adhesive, or other fastening mechanism) to the base plate 420.

The rear lock 200 can be covered by a lock cover 430 on the outer surface facing the outer panel 250.

Figure 5A:
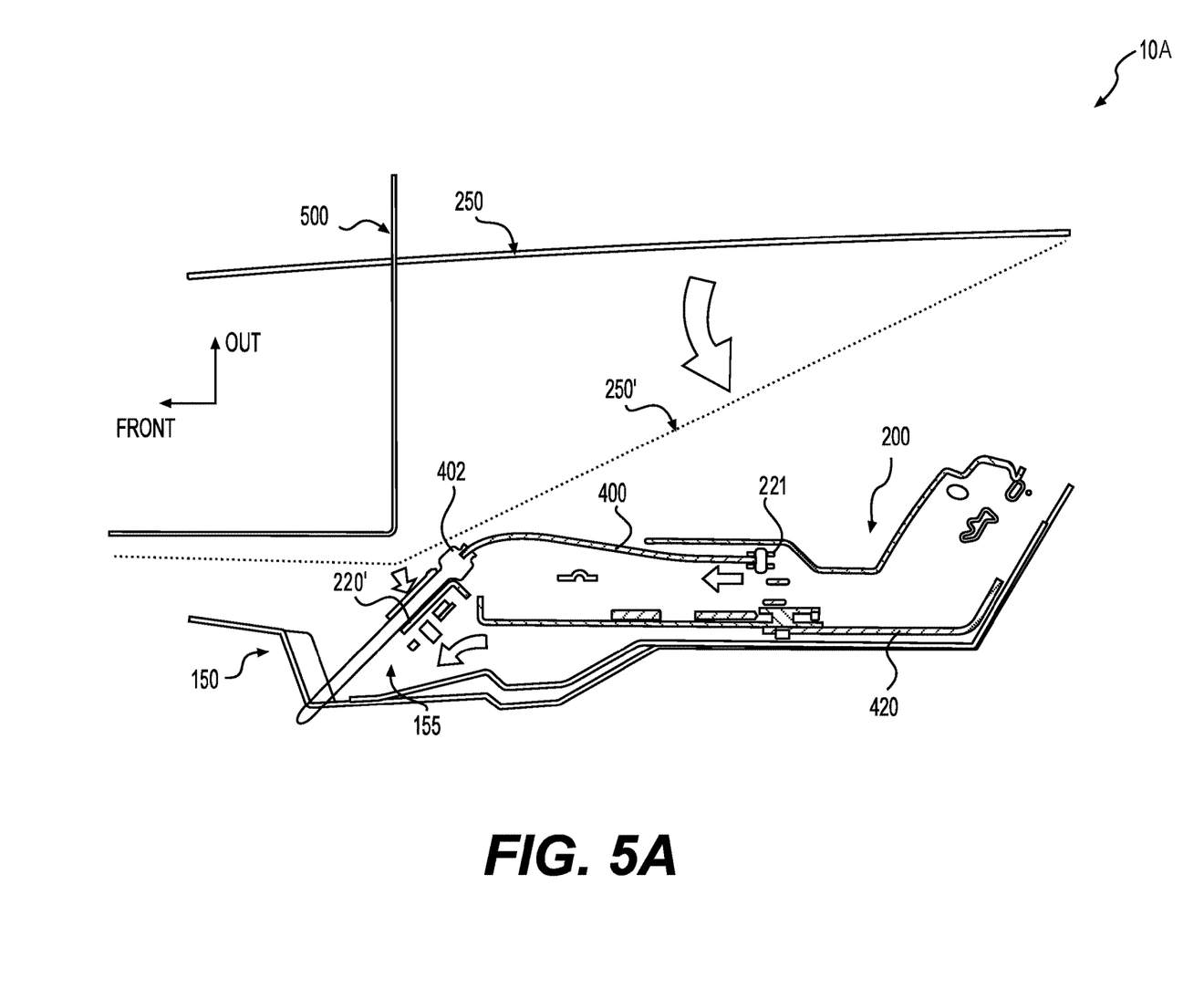
FIG. 5A is a cross-section view of the sliding door with the rear lock after an impact testing according to an exemplary embodiment of the present disclosure.
Figure 5B:
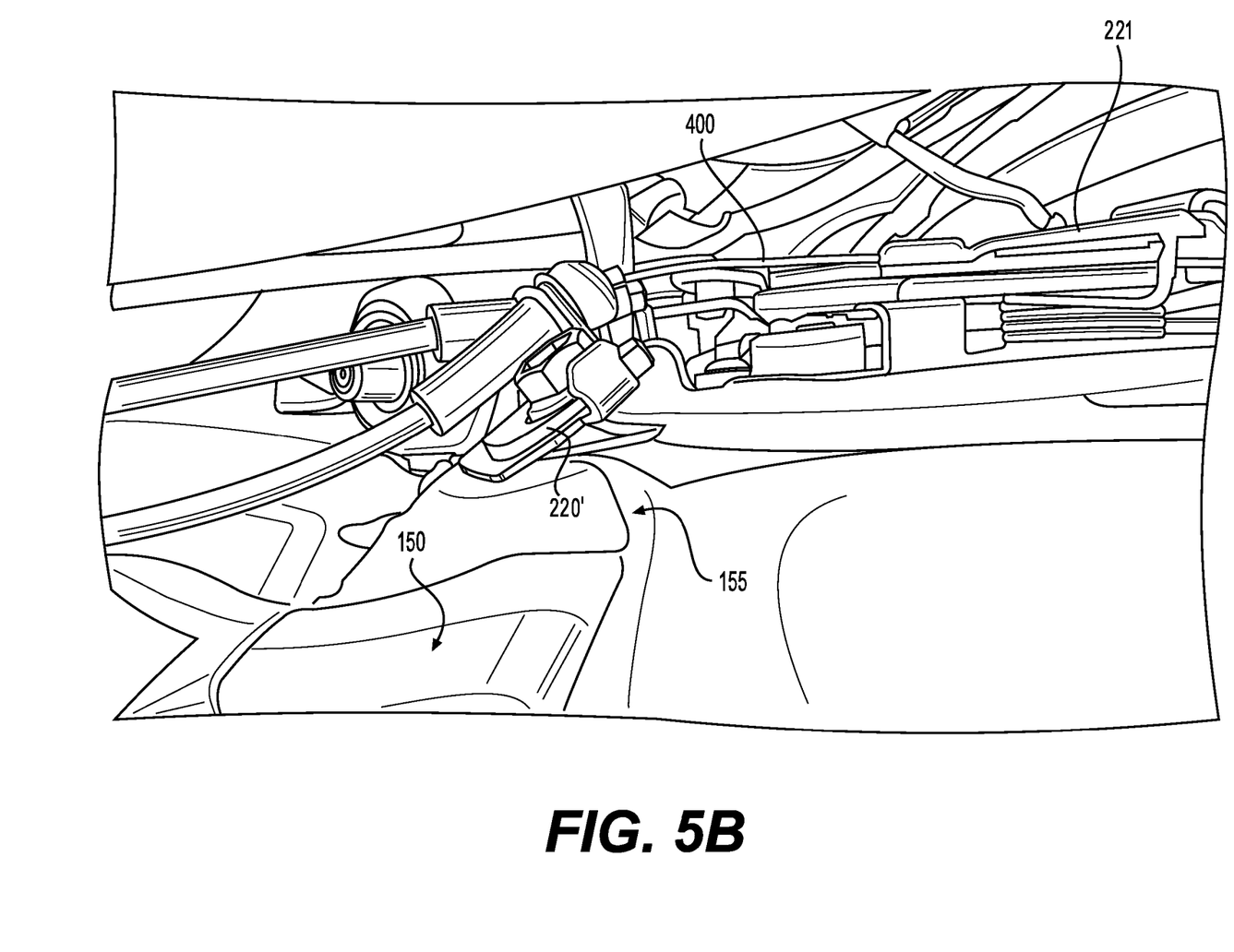
FIG. 5B is an image of the existing sliding door with the rear lock after an impact testing according to an exemplary embodiment of the present disclosure.

FIG. 5A is a cross-section view of the sliding door 10A with the rear lock 200 after an impact according to an exemplary embodiment of the present disclosure. The impact can occur on the outer panel 250, for example, by a barrier 500, a vehicle, or other objects. The impact may cause the outer panel 250 to deform as illustrated to form a deformed outer panel 250'. The impact by the barrier 500 can further impact the cable mounting plate 220 causing it to bend into the inner space 155 about the fixed point (e.g., about the cable cover 402). A deformed cable mounting plate 220' can create a tension in the cable 400 causing the cable 400 to pull the release lever 221 and unlatch the rear lock 200. An example of the sliding door 10 with the rear lock 200 after an impact testing where the cable mounting plate 220' is deformed due to impact is shown in FIG. 5B according to an exemplary embodiment of the present disclosure.

Figure 6A:
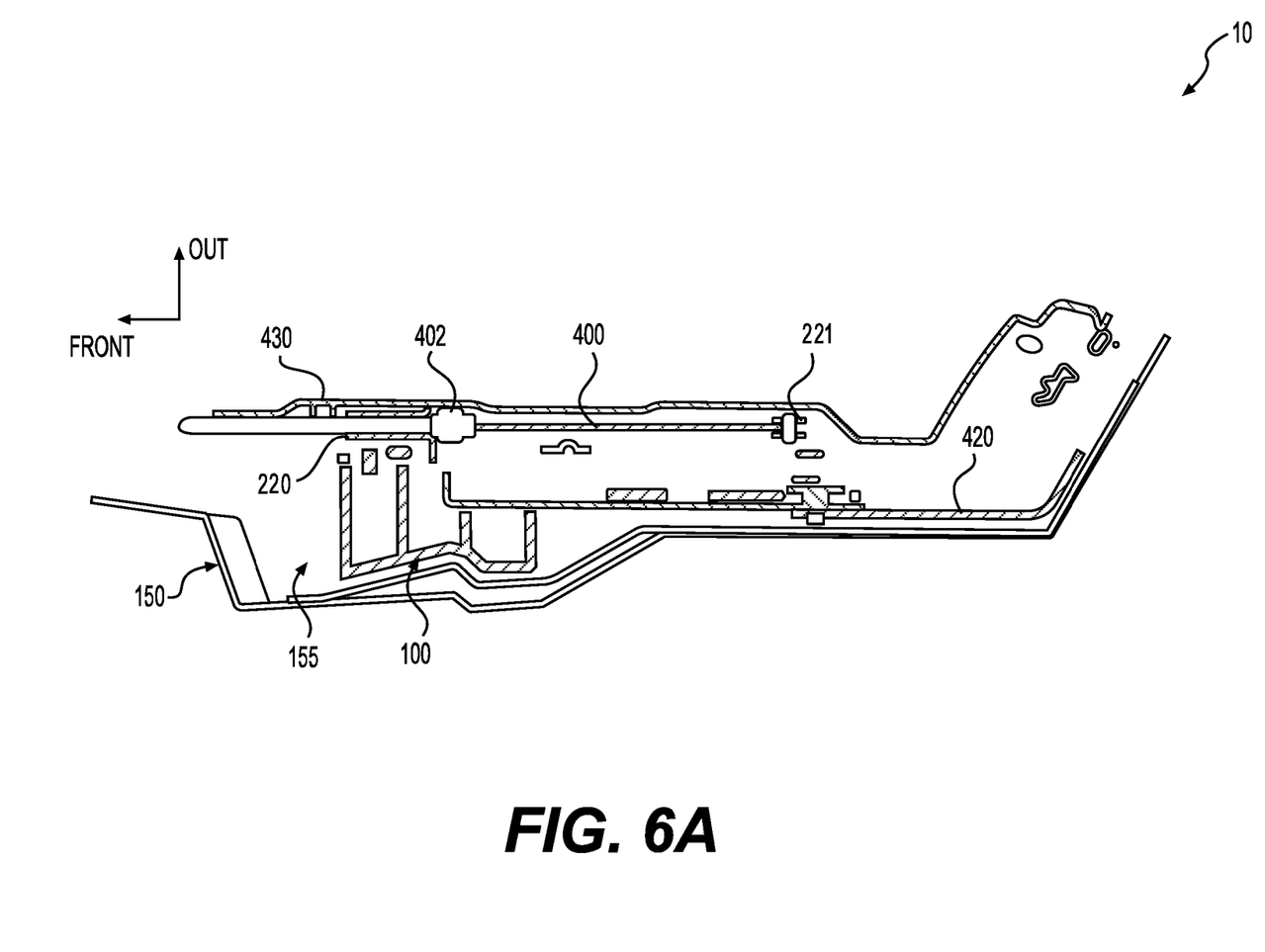
FIG. 6A is a cross-section view of the sliding door with the protector block according to an exemplary embodiment of the present disclosure.

FIG. 6A is a cross-section view of the sliding door 10 with the protector block 100 assembled within the inner space 155 according to an exemplary embodiment of the present disclosure. The protector block 100 being irregular in shape can fill up the inner space 155 and support the cable mounting plate 220. As such, upon impact, for example, with the barrier 500 (not illustrated), the protector block 100 prevents the cable mounting plate 220 from bending inwards into the inner space 155. Hence, the cable 400 is not pulled and the release lever does not move or unlatch the rear lock 200.

Figure 6B:
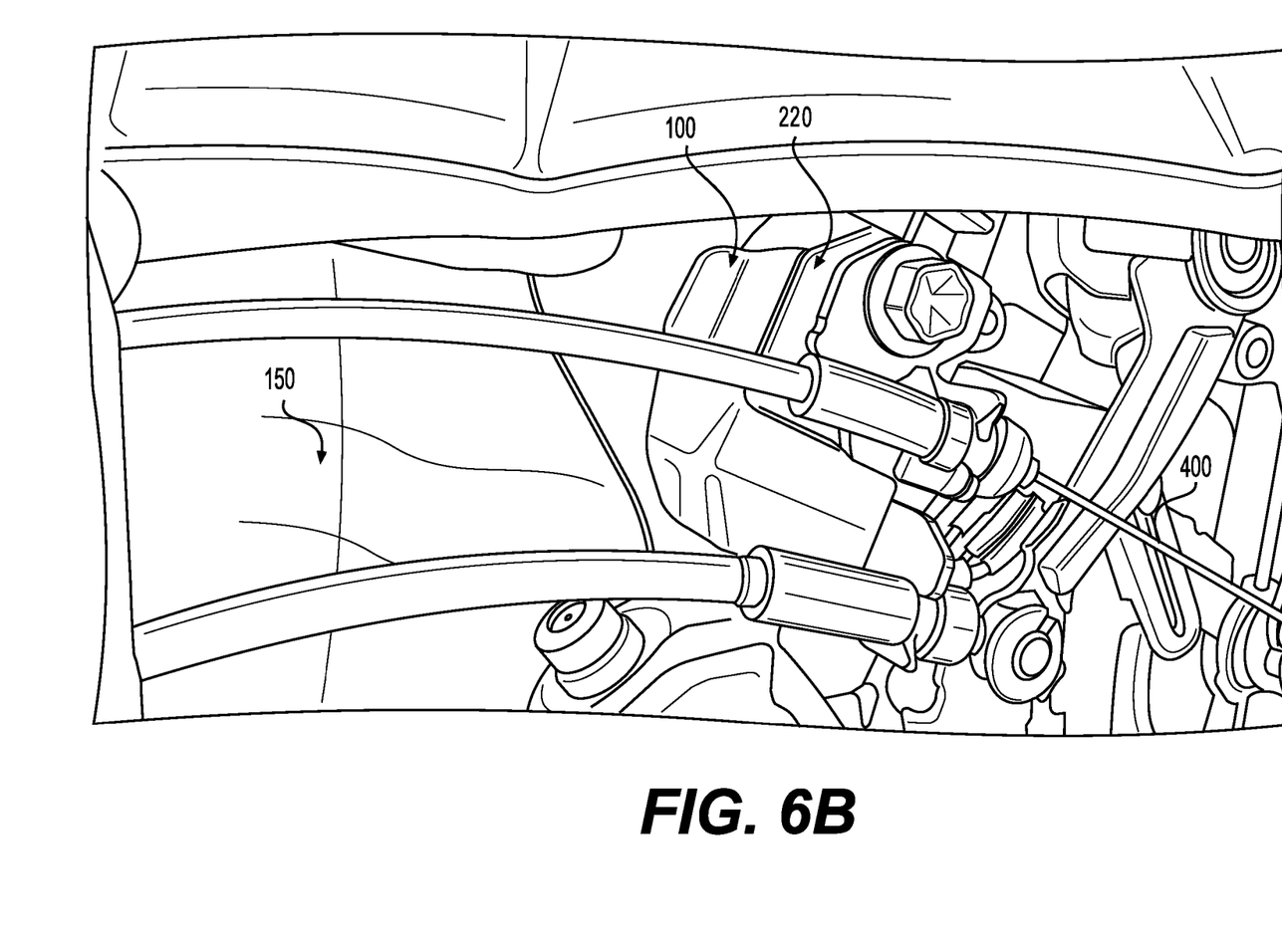
FIG. 6B is an image of the sliding door with the protector block according to an exemplary embodiment of the present disclosure.

FIG. 6B is an image of the protector block 100 assembled behind the cable mounting plate 220 according to an exemplary embodiment of the present disclosure.

Figure 7:
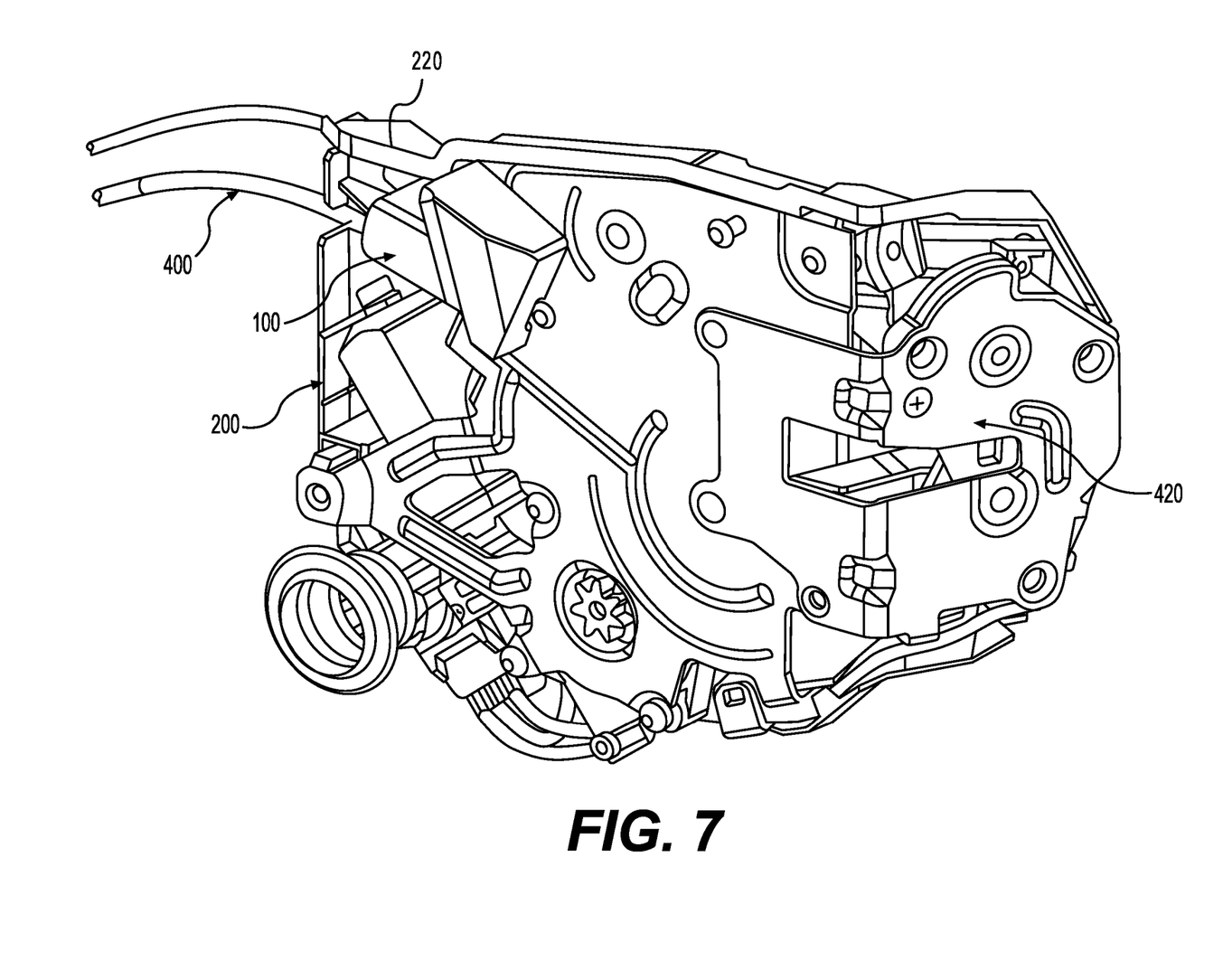
FIG. 7 is a perspective view of the rear lock with the protector block according to an exemplary embodiment of the present disclosure.

FIG. 7 is a perspective view of the rear lock 200 with the protector block 100 according to an exemplary embodiment of the present disclosure. FIG. 7 also illustrates the base plate 420 used for mounting the rear lock 200 with the inner panel 150 (not illustrated). It should be noted that the rear lock 200 can be any lock and does not limit the scope of the present disclosure, as can be understood by a person skilled in the art.

Figure 8:
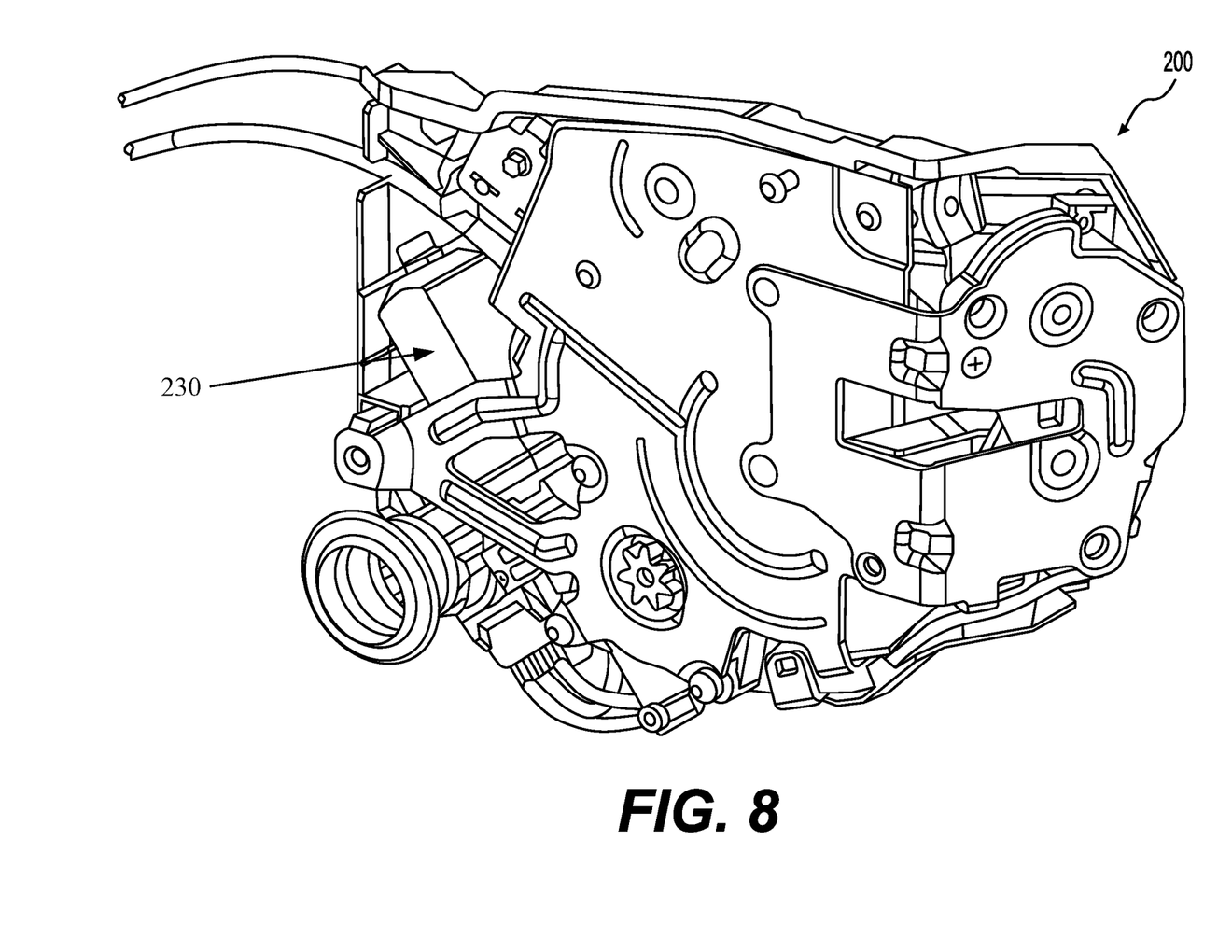
FIG. 8 is perspective view of the rear lock according to an exemplary embodiment of the present disclosure.

FIG. 8 is perspective view of the rear lock 200 exposing details on the inner surface 230 of the rear lock 200 facing the inner panel 150 according to an exemplary embodiment of the present disclosure. The inner surface 230 may have irregular shape and may not be flat; as components of the locking mechanism of the rear lock 200 can extend from the inner surface 230 creating bumps or valleys.

Figure 9:
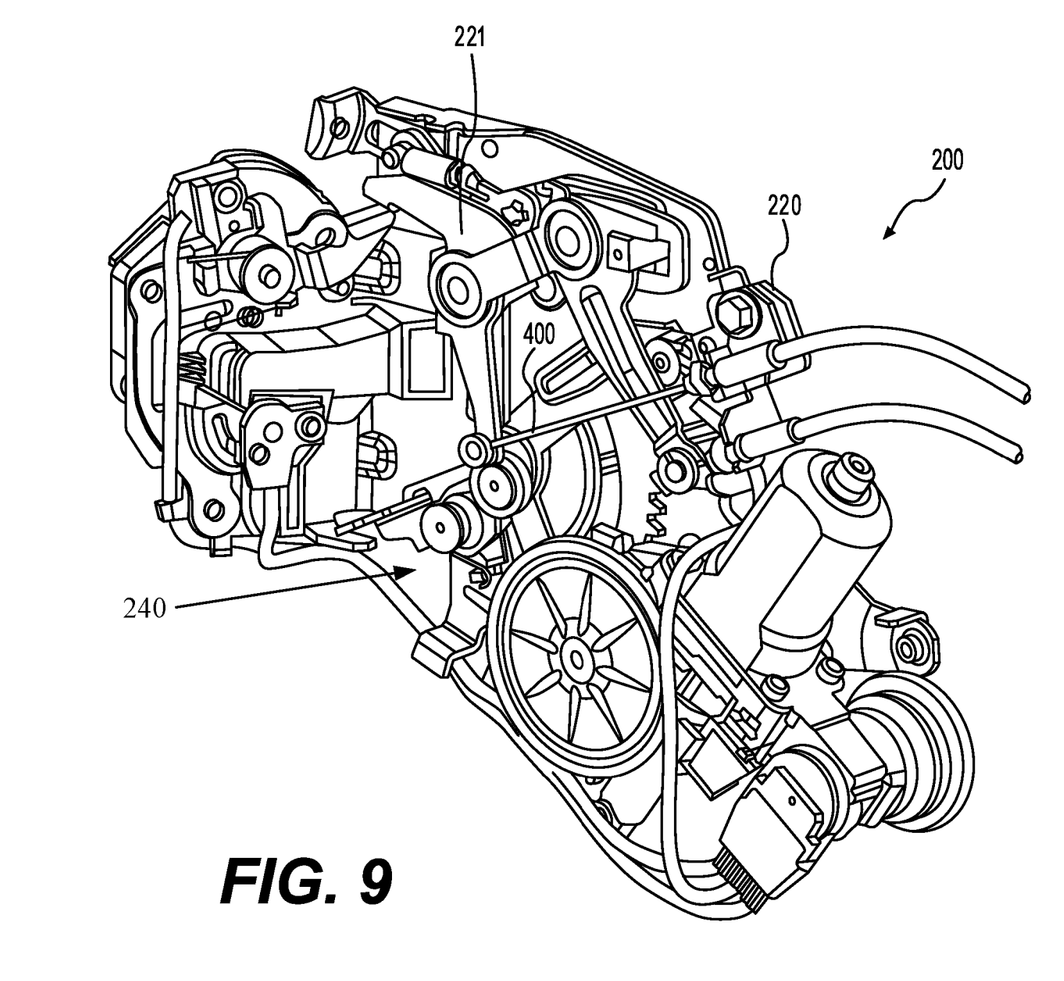
FIG. 9 is perspective view of the rear lock illustrating an exemplary actuation mechanism according to an exemplary embodiment of the present disclosure.

FIG. 9 is perspective view of the rear lock 200 exposing details on the outer surface 240 of the rear lock 200 facing the outer panel 250 according to an exemplary embodiment of the present disclosure. The outer surface 240 may have irregular shape and may not be flat; as components of the locking mechanism of the rear lock 200 can extend from the outer surface 240 creating bumps or valleys.

In one embodiment, the outer surface 240 can also be referred as a first side 240 of the rear lock 200 indicating the side where the cable 400 visibly extends and connects to the release lever 221. Similarly, the inner surface 230 can also be referred as a second side 230 of the rear lock 200 indicating a side opposite to first side 240.

The protector block 100 according to the present disclosure can have several advantages. For example, the protector block 100 can support and prevent bending of the cable mounting plate 220 that can cause the rear lock 200 to unlatch. Further, the protector block 100 can absorb the impact energy which may damage components connected to the protector block. The protector block 100 can allow manipulation of a bend axis and/or deformation modes of the cable mounting plate 220 (or other lock components). The protector block 100 can be a cost-effective, light weight and provide design flexibility to prevent/control deformation compared to other methods such as using metal flanges from the mounting plate, embossing shapes into the inner panel, etc. The protector block 100 can be modified to allow one lock to be used in multiple vehicles with different packing conditions.

It should be noted that, the present invention is not limited to the combination of the protector block 100 and the rear lock 200. The protector block 100 can be configured to and adopted to fit any lock where a cantilever beam supporting a lock cable is observed that upon impact can cause the lock to release (or unlock/unlatch), as can be understood by a person skilled in the art.

While certain embodiments have been described, these embodiments have been presented by way of example only, and are not intended to limit the scope of the present disclosures. Indeed, the novel apparatuses described herein can be embodied in a variety of other forms; furthermore, various omissions, substitutions and changes in the form of the apparatuses described herein can be made without departing from the spirit of the present disclosures. The accompanying claims and their equivalents are intended to cover such forms or modifications as would fall within the scope and spirit of the present disclosures.

What is claimed is:

1. A lock comprising:
   a cable located on a first side of the lock;
   a release lever connected to the cable;
   a cable mounting plate supporting the cable on a first side of the cable mounting plate; and
   a protector block including ribs, which is non-movably attached on a second side surface of the cable mounting plate that is spaced from and opposite to the first side of the cable mounting plate, and which overlaps with the cable mounting plate in a direction perpendicular to at least one of the first and second sides of the cable mounting plate, to prevent the cable mounting plate from buckling when a force is applied on the first side of the cable mounting plate.

2. The lock according to claim 1, wherein the lock is a rear lock of a sliding door.

3. The lock according to claim 1, wherein the protector block is a nonsymmetrically shaped component.

4. The lock according to claim 1, wherein the protector block is made of a resin material.

5. The lock according to claim 1, wherein the protector block includes the ribs and pockets.

6. The lock according to claim 1, wherein the protector block includes a first cylinder, a second cylinder, and a fastening hole.

7. The lock according to claim 6, wherein the lock includes:
a first hole,
a second hole, and
a fastening hole,
the first hole receives the first cylinder of the protector block, and the second hole receives the second cylinder of the protector block thus aligning the fastening hole of the lock with the fastening hole of the protector block to receive a fastener.

8. The lock according to claim 1, wherein the ribs extend in the direction perpendicular to at least one of the first and second sides of the cable mounting plate.

9. The lock according to claim 1, wherein the protector block is directly attached to the second side surface of the cable mounting plate.

10. A door comprising:
an inner panel; and
the lock according to claim 1, the lock including an inner surface, the inner surface faces the inner panel and connects to the inner panel such that an inner space is created between the cable mounting plate and the inner panel, wherein
the protector block is connected to the inner surface of the lock within the inner space present between the cable mounting plate and the inner panel.

11. The door according to claim 10, wherein the lock is a rear lock of a sliding door.

12. The door according to claim 10, wherein the cable mounting plate holds the cable that connects to the release lever of the lock.

13. The door according to claim 10, wherein the protector block is a nonsymmetrically shaped component.

14. The door according to claim 10, wherein the protector block is made of a resin material.

15. The door according to claim 10, wherein the protector block includes the ribs and pockets.

16. The door according to claim 10, wherein the protector block includes a first cylinder, a second cylinder, and a fastening hole.

17. The door according to claim 16, wherein the lock includes:
a first hole,
a second hole, and
a fastening hole,
the first hole receives the first cylinder of the protector block, the second hole receives the second cylinder of the protector block thus aligning the fastening hole of the lock with the fastening hole of the protector block to receive a fastener.

18. A lock comprising:
a cable located on a first side of the lock;
a release lever connected to the cable;
a cable mounting plate supporting the cable on a first side of the cable mounting plate;
a protector block located on a second side of the cable mounting plate and preventing the cable mounting plate from buckling when a force is applied on the first side of the cable mounting plate;
a first hole;
a second hole; and
a fastening hole of the lock, wherein
the protector block includes a first cylinder, a second cylinder; and a fastening hole of the protector block, and
the first hole receives the first cylinder of the protector block, and the second hole receives the second cylinder of the protector block thus aligning the fastening hole of the lock with the fastening hole of the protector block to receive a fastener.

* * * * *